United States Patent
Aryal (10) Patent No.: US 10,249,314 B1
(45) Date of Patent: Apr. 2, 2019

(54) VOICE CONVERSION SYSTEM AND METHOD WITH VARIANCE AND SPECTRUM COMPENSATION

(71) Applicant: Sandesh Aryal, Pasadena, CA (US)

(72) Inventor: Sandesh Aryal, Pasadena, CA (US)

(73) Assignee: OBEN, INC., Pasadena, CA (US)

(*) Notice: Subject to any disclaimer, the term of this patent is extended or adjusted under 35 U.S.C. 154(b) by 0 days.

(21) Appl. No.: 15/656,993

(22) Filed: Jul. 21, 2017

Related U.S. Application Data (60) Provisional application No. 62/365,016, filed on Jul. 21, 2016.

(51) Int. Cl.
  *G10L 21/007* (2013.01)
  *G10L 25/30* (2013.01)
  (Continued)

(52) U.S. Cl.
  CPC .............. *G10L 21/007* (2013.01); *G06N 3/08* (2013.01); *G10L 25/18* (2013.01); *G10L 25/30* (2013.01)

(58) Field of Classification Search
  CPC ....... G10L 25/18; G10L 25/30; G10L 21/007; G06N 3/08
  See application file for complete search history.

(56) References Cited

U.S. PATENT DOCUMENTS

| | | | | |
|---|---|---|---|---|
| 2008/0082333 | A1* | 4/2008 | Nurminen | G10L 21/00 704/250 |
| 2011/0064258 | A1* | 3/2011 | Aggarwal | H04S 7/302 381/394 |

(Continued)

OTHER PUBLICATIONS

Kain, Alexander, and Michael W. Macon, "Spectral voice conversion for text-to-speech synthesis." Proceedings of the 1998 IEEE International Conference on Acoustics, Speech and Signal Processing, 1998. vol. 1. (Year: 1998).*

(Continued)

*Primary Examiner* — Paras D Shah
*Assistant Examiner* — Oluwadamilola M Ogunbiyi
(74) *Attorney, Agent, or Firm* — Andrew S. Naglestad (57) ABSTRACT

A voice conversion system for generating realistic, natural-sounding target speech is disclosed. The voice conversion system preferably comprises a neural network for converting the source speech data to estimated target speech data; a global variance correction module; a modulation spectrum correction module; and a waveform generator. The global variance correction module is configured to scale and shift (or normalize and de-normalize) the estimated target speech based on (i) a mean and standard deviation of the source speech data, and further based on (ii) a mean and standard deviation of the estimated target speech data. The modulation spectrum correction module is configured to apply a plurality of filters to the estimated target speech data after it has been scaled and shifted by the global variance correction module. Each filter is designed to correct the trajectory representing the curve of one MCEP coefficient over time. Collectively, the plurality of filters are designed to correct the trajectories of each of the MCEP coefficients in the target voice data being generated from the source speech data. Once the MCEP coefficients are corrected, they are then provided to a waveform generator configured to generate the target voice signal that can then be played to the user via a speaker.

16 Claims, 5 Drawing Sheets

(51) Int. Cl.
*G06N 3/08* (2006.01)
*G10L 25/18* (2013.01)

(56) References Cited

U.S. PATENT DOCUMENTS

| | | | | |
|---|---|---|---|---|
| 2013/0218568 A1* | 8/2013 | Tamura | ............... | G10L 13/033 |
| | | | | 704/260 |
| 2013/0238334 A1* | 9/2013 | Ma | ............... | G10L 17/16 |
| | | | | 704/244 |
| 2014/0270226 A1* | 9/2014 | Borgstrom | ............... | G10L 17/00 |
| | | | | 381/71.11 |
| 2015/0127349 A1* | 5/2015 | Agiomyrgiannakis | ............... | |
| | | | | G10L 15/142 |
| | | | | 704/266 |
| 2015/0161522 A1* | 6/2015 | Saon | ............... | G06N 3/0454 |
| | | | | 706/12 |
| 2015/0199956 A1* | 7/2015 | Tan | ............... | G10L 13/08 |
| | | | | 704/260 |
| 2017/0206892 A1* | 7/2017 | Doddipatla | ............... | G10L 15/063 |
| 2018/0012613 A1* | 1/2018 | Sun | ............... | G10L 15/08 |

OTHER PUBLICATIONS

Kain, Alexander, and Michael W. Macon. "Design and evaluation of a voice conversion algorithm based on spectral envelope mapping and residual prediction." IEEE International Conference on Acoustics, Speech and Signal Processing, 2001. (Year: 2001).*

Desai, Srinivas, et al. "Voice conversion using artificial neural networks." IEEE International Conference onAcoustics, Speech and Signal Processing, 2009. (Year: 2009).*

* cited by examiner

VOICE CONVERSION SYSTEM AND METHOD WITH VARIANCE AND SPECTRUM COMPENSATION

CROSS-REFERENCE TO RELATED APPLICATION(S)

This application claims the benefit of U.S. Provisional Patent Application Ser. No. 62/365,016 filed Jul. 21, 2016, titled "An efficient and robust technique for improving intelligibility and naturalness of DNN-based voice," which is hereby incorporated by reference herein for all purposes.

TECHNICAL FIELD

The invention generally relates to the field of voice conversion. In particular, the invention provides a system and method for producing natural-sounding voice data using variance and spectrum compensation.

BACKGROUND

Voice conversion systems are designed to convert speech from a source speaker to sound like it is produced by a target speaker. Most of the existing techniques for voice conversion consist of the following steps: Split speech signal into overlapping segments (frames) at certain interval, extract features that capture the spectral characteristic of the segment, time align the sentences spoken by the source and target speakers, learn a function that can estimate the equivalent target MCEP coefficients for a given frame of source MCEP coefficients. In approaches based on deep neural networks (DNN), a DNN serves as the model of the estimation function. To learn this function, a DNN is trained using the source MCEP coefficients as input and the corresponding MCEP coefficients from the target speaker as output. Once trained, the DNN model generates equivalent target MCEP coefficients as output when the source MCEP coefficients are fed as inputs.

Given a recording of the test sentence from the source speaker and the trained model, the system estimates the sequence of target MCEP coefficients for that sentence. A speech signal is then generated from sequence of estimated MCEP coefficients. This approach is effective in voice conversion but the resulting speech has low acoustic quality and naturalness. There is therefore a need for a technique to improve the naturalness and quality of voice conversion.

SUMMARY

The invention in the preferred embodiment features a system and method for performing voice conversion with a realistic, natural-sounding target voice. The voice conversion system preferably comprises a microphone for recording source speech data; a neural network for converting the source speech data to an estimate of the target voice referred to herein as the estimated target speech data; a global variance correction module; a modulation spectrum correction module; and a waveform generator. The global variance correction module is configured to scale and shift the estimated target speech based on (i) a mean and standard deviation of the source speech data, and further based on (ii) a mean and standard deviation of the estimated target speech data. The modulation spectrum correction module is configured to apply a plurality of filters to the estimated target speech data after being scaled and shifted by the global variance correction module. Each of the plurality of filters is generated based on two trajectories, namely (i) a first trajectory consisting of a single MCEP feature, for example, extracted from a sequence of training speech frames acquired from a target speaker, and (ii) a second trajectory consisting of a single MCEP feature extracted from a plurality target training speech frames generated by said neural network. As such, each filter is designed to correct the trajectory representing the curve of one MCEP coefficient over time. The plurality of filters are designed to correct the trajectories of each of the MCEP coefficients in the target voice data being generated from the source speech data. Once the MCEP coefficients are corrected, they are then provided to a waveform generator configured to generate the target voice signal that can then be played to the user via a speaker.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

The voice conversion method of the present invention consists of two phases including a training phase and a conversion phase. During the training phase shown in FIG. 1, the parameters required for adjusting global variance and modulation spectrum are estimated from training sentences. During the conversion phase shown in FIG. 4, these parameters are used to adjust the sequence of DNN-estimated acoustic features for a given utterance undergoing voice conversion. The process for estimating the global variance and modulation spectrum compensation parameters, and process for applying them during the conversion phase, are explained below in detail.

Figure 1:
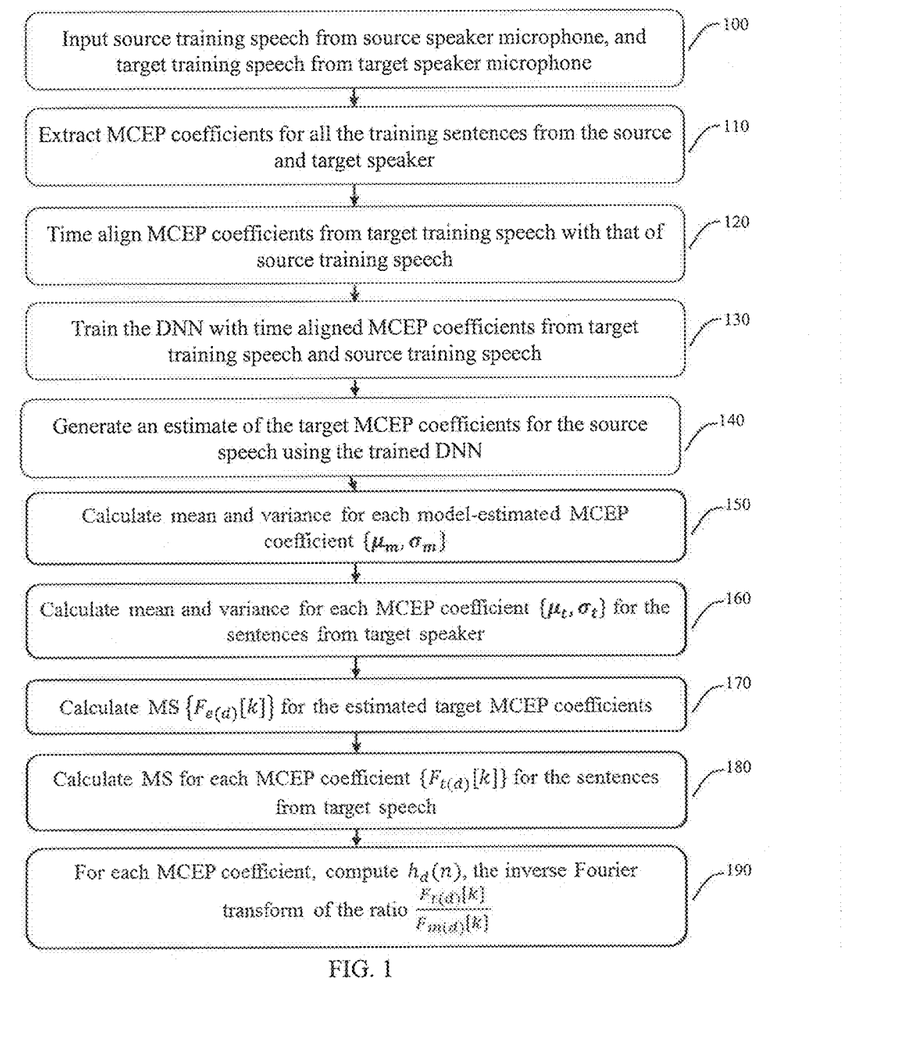
FIG. 1 is a flow chart of a method of training a deep neural network and performing variance and frequency compensation of estimated MCEP coefficient trajectories, in accordance with a preferred embodiment of the present invention.

Illustrated in FIG. 1 is a flow chart of a method of training a deep neural network and performing variance and spectrum compensation. To start, the voice data is received 100 from a microphone or the recording retrieved from a memory device, for example. The voice data includes training data from both a source speaker and a target speaker. Each recording general includes a recording of the speaker reciting a plurality of sentences that are selected to capture a wide variety of phonemes and diphones in order to accurately convert new source speech. The speech data in the preferred embodiment comprises overlapping segments—also known as frames—typically 25 ms segments at 5 ms interval.

MCEP coefficients are then extracted 110 from each of the two data sets of utterances. Mel cepstral (MCEP) coefficients represent the short-term power spectrum as the linear cosine transform of the log power spectrum on a nonlinear Mel scale of frequency. In the Mel cepstral representation, an utterance can be represented as a time sequence of D-dimensional vectors y $(=[y_1, y_2 \ldots y_T])$ of length T, where $y_t(=[y_t(1), y_t(2), \ldots y_t(d), \ldots y_t(D)])$ is a vector of D MCEP coefficients representing the spectral characteristics of a speech segment at time frame t, and T is the number of frames in the utterance. Although MCEP coefficients are the features used to characterize the voice data in the preferred embodiment, other features including linear prediction coefficients (LPC), line spectral frequencies (LSF), and short term Fourier Transform (STFT) features may also be used instead of MCEP coefficients.

Next, the sentences spoken by the source and target speaker are aligned 120. In particular, individual frames of the target training speech, $y_t$, are temporally aligned or otherwise matched with the source training speech, $y_s$. Frames are matched based on the MCEP coefficients extracted from these source and target frames. The result of this step is a table consisting pairs of source and target frames with matching MCEP coefficients. Thereafter, the MCEP coefficients of matching source and target frames are used to train 130 a deep neural network (DNN) that takes the source MCEP coefficients as input and outputs an estimate of the target MCEP coefficients with which to reconstruct sentences in the voice of the target speaker but comprising the same speech as that spoken by the source speaker. In the preferred embodiment, the DNN consists of 2 hidden layers of 512 nodes each. The input and output layers are generally of the same size and the number of MCEP coefficients, typically 51 nodes. For purposes of generating the variance and spectrum compensation factors, the complete set of source training sentences are converted to equivalent target speech in order to estimate 140 a complete set of MCEP coefficients representing a complete set of target train speech.

The invention in the preferred embodiment then generates the variance and spectrum compensation factors necessary to restore the acoustic quality or fidelity of the converted speech data that is typically lost during prior art voice conversion operations. The present invention adjusts the estimated MCEP coefficients after conversion so that the (a) scale and shift of each frame and (b) the modulation spectrum of the time-sequence of MCEP coefficients of estimated target speech more closely match that of the actual target speech. The temporal trajectories of MCEP coefficients are adjusted independently for each MCEP coefficient.

Generation of the variance compensation factors begins with the calculation of the mean and variance. In particular, the mean ($\mu_{m(d)}$) and standard deviation ($\sigma_{m(d)}$) are calculated 150 for each MCEP coefficient (d=1, 2 . . . D). Similarly, the mean ($\mu_{t(d)}$) and standard deviation ($\sigma_{t(d)}$) of the MCEP coefficients extracted for the same training sentences from the target speaker are calculated 160. The mean and standard deviations $\{\mu_{m(d)}, \sigma_{m(d)}, \mu_{t(d)}, \text{and } \sigma_{t(d)}\}$ are the global variance (GV) compensation parameters that are later applied to improve the naturalness of the voice conversion.

Given a sequence of MCEP vectors in an utterance y $(=[y_1, y_2 \ldots y_T])$, the global variance (GV) is defined as a vector $v(y)=[v(1), v(2) \ldots v(D)]$, where D is the number of MCEP coefficients and $v(d)=E[(y_t(d)-E[y_t(d)])^2]$, d=1 . . . D is within-sentence variance of the $d^{th}$ MCEP coefficient $y_t(d)$.

Next, the spectrum compensation factors necessary to restore the acoustic quality of the converted speech data are computed 170. The spectrum compensation factors are based on a modulation spectrum (MS), which captures the frequency components of a trajectory, i.e., temporal sequence, of MCEP coefficients. For each MCEP coefficient (d), the MS is calculated as the log of frequency magnitude spectrum ($F_d[k]$, k=0, 1, . . . K) of the time-sequence $y(d)=[y_1(d), y_2(d) \ldots y_t(d) \ldots y_T(d)]$ as given by equation 1. The sequence is based on one-second long segments and the MS computed by averaging the log-spectra of these segments:

$$F_d[k] = \log_{10} \left\| \sum_{t=0}^{T-1} y_t(d) e^{-2\pi i k \left(\frac{t}{T}\right)} \right\| \quad (1)$$

For each MCEP coefficient, the spectrum compensation factors constitute a digital filter that enhances the higher frequency components of the DNN-estimated trajectory of that coefficient. For each MCEP coefficient (d=1, 2 . . . D), the modulation spectrum, ($F_{t(d)}[k]$, k=1, 2 . . . . K), of all one-second long segments taken from the target speaker's training sentences is calculate 180. The MS ($F_{m(d)}$ [k], k=1, 2 . . . K) for the sequence of DNN-estimated MCEP coefficients for the same set of training sentences is also computed 170. The required gain for each normalized frequency k is then given by the ratio $$\frac{F_{t(d)}[k]}{F_{m(d)}[k]}.$$

The real part of the inverse Fourier transform of $$\left\{ \frac{F_{t(d)}[k]}{F_{m(d)}[k]}, k-1, 2, \ldots K \right\}$$

specifically is computed and used to generate 190 the impulse response ($h_d(n)$, n=1, 2, . . . K) of the digital filter. This digital filter is used for adjustment or correction of the modulation spectrum of the $d^{th}$ coefficient in the voice-converted data during operations after completion of the DNN training.

Figure 2A:
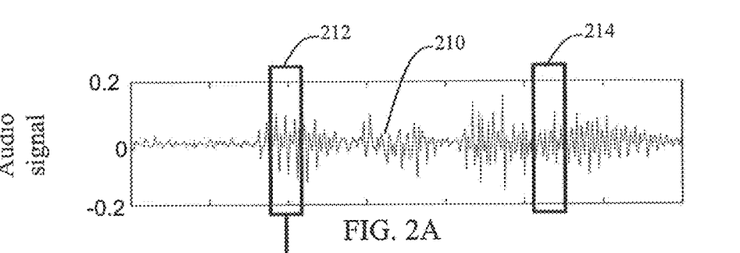
FIG. 2A is an audio signal of a sentence spoken by a speaker.

As described above in step 110 of FIG. 1, MCEP coefficients are extracted from each of the source training speech and target training speech data sets. A representative audio signal 210 of a sentence spoken by a speaker is illustrated in FIG. 2A. Two frames 212, 214 of the sampled audio signal are illustrated by rectangular boxes, which correspond to segments or frames of the audio data. MCEP coefficients are extracted for each frame of each sentence of the audio signal data. Each frame is represented by a vector of D MCEP coefficients $y_t(=[y_t(1), y_t(2), \ldots y_t(d), \ldots y_t(D)])$ where t is the frame index.

Figure 2B:
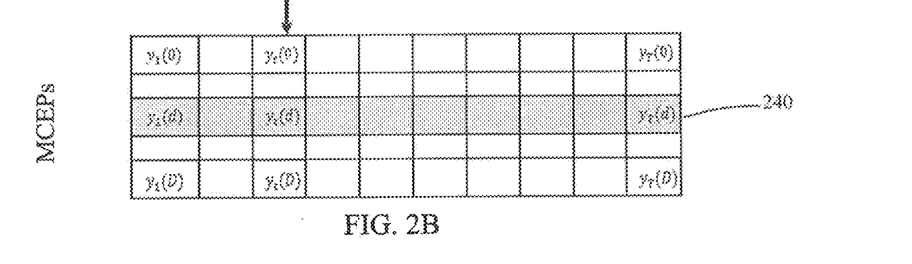
FIG. 2B is a representation of a sentence as a time sequence of MCEP coefficients.
Figure 2C:
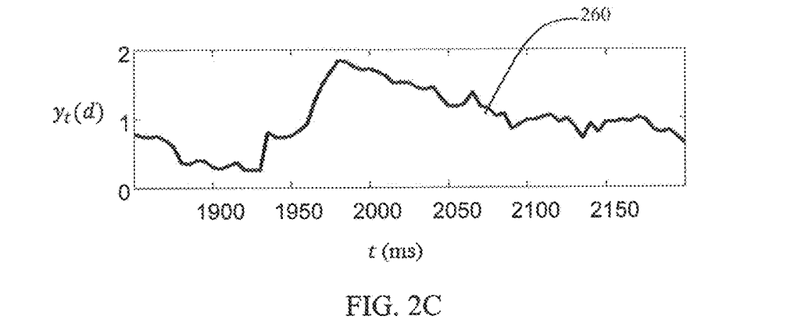
FIG. 2C is a temporal trajectory of the $d^{th}$ coefficient ($d^{th}$ row in matrix format)

The sentence is then represented by a time-sequence of vectors, each vector comprising MCEP coefficients, as shown in FIG. 2B. The temporal trajectory of a particular MCEP coefficient is illustrated by the plot 260 in FIG. 2C. As shown, the magnitude of the particular MCEP coefficient, which corresponds to row 240 in the matrix representation in FIG. 2B, varies significantly over time over the duration of the sentence. The time-varying function can then be described in terms of its spectral composition, which is discussed in more detail below.

Figure 3:
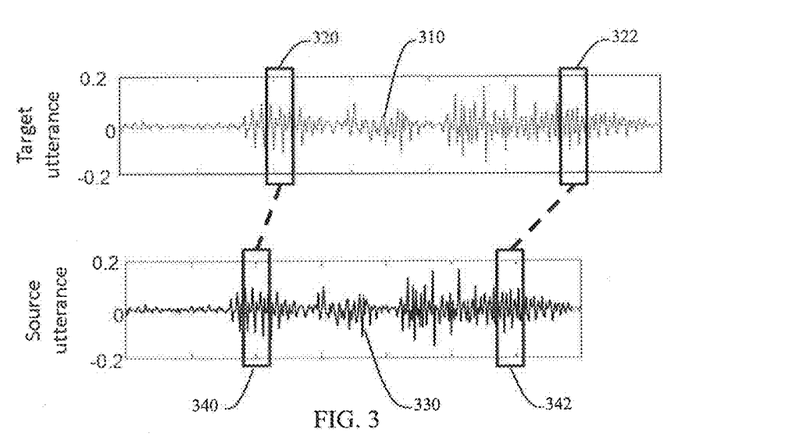
FIG. 3 illustrates the matching of audio segments from the source and target utterances of the same sentence.

As described above, the frames of the target audio segments are matched in time with the frames of the source audio data. This alignment of a given sentence in the target speaker audio signal 310 and source speaker audio signal 330 is illustrated graphically in FIG. 3 using two pairs of frames. As shown, a first frame 320 in the target speech matches a first frame 340 in the source speech. The two frames 320, 340 capture the same phoneme or diphone, for example, at the same point in the sentence being recited. The two frames 320, 340 are matched based on the similarity of the MCEP coefficients, or other audio feature extracted from the audio data. Similarly, a second frame 322 in the target speech matches a second frame 342 in the source speech. As can be seen, the temporal offset between the first pair of frames 320, 340 is different than the temporal offset between the second pair of frames 322, 342. This variation in offset is removed by the alignment operation in order to precisely match the source speech with the target speech.

Figure 4:
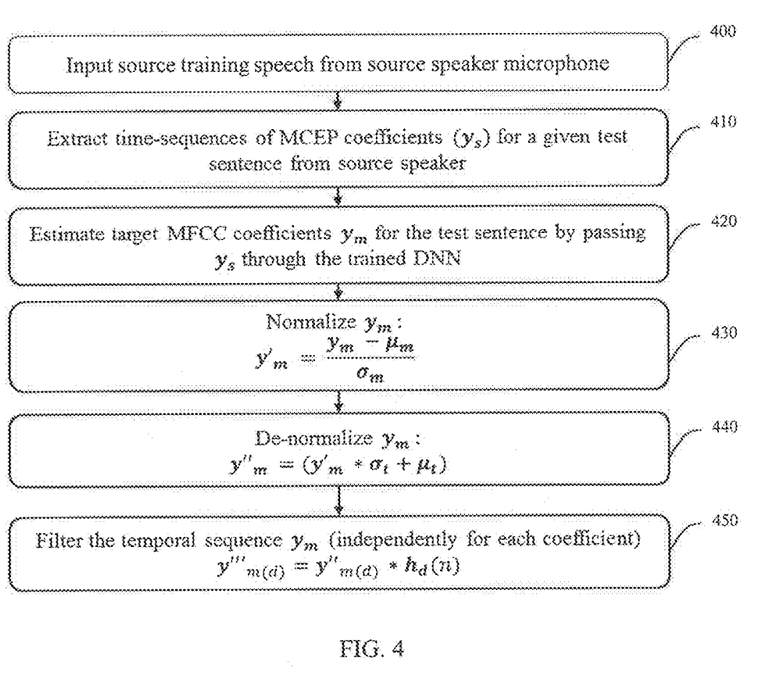
FIG. 4 is flowchart of the processing for converting source speech to target speech with variance and spectrum compensation, in accordance with one embodiment of the present invention.

Illustrated in FIG. 4 is flowchart of the processing for converting source speech to target speech with the variance and spectrum compensation factors. Real-life source speech may be accurately converted to target speech when the DNN is fully trained and the variance and spectrum compensation factors computed in the manner described in FIG. 1. At that point, a person may speak into a microphone and the input audio data accurately converted into realistic-sounding target speech. The voice conversion process begins with the input 400 of source speech, $y_s$, from the microphone of a mobile device, for example. The MCEP coefficients of the source speech are extracted 410 and provided as input to the trained DNN, which then outputs 420 an initial estimate of the MCEP coefficients, $y_m$, representing the corresponding target speech.

Next, the variance and spectrum compensation factors are applied to recover some of the quality of the original fidelity of the target speech. With respect to the variance compensation, for each MCEP acoustic feature (d=1, 2, . . . D), the DNN estimated sequence is normalized 430 using the average and standard deviation parameters, ($\mu_{m(d)}$ and $\sigma_{m(d)}$), for the DNN-based estimates of the target speech. The process of normalization effectively performs a "shift and scale" operation on the estimate target speech, $y_m$ to produce a modified target speech, $y'_m$. After normalization, the modified target speech, $y'_m$ sequence is then de-normalized 440 using the mean and standard deviation parameters for target speaker ($\mu_{t(d)}$ and $\sigma_{t(d)}$) to produce the corrected target speech estimate, $y''_m$.

With respect to the spectrum compensation, the de-normalized sequence $y''_m$ is convolved with the impulse response filter, $h_d(n)$. The resulting MCEP coefficients after filtering, which consist of variance and spectrum compensated target speech estimates $y'''_m$, may then be converted into a waveform and the target voice signal played to the user via a speaker.

Figure 5:
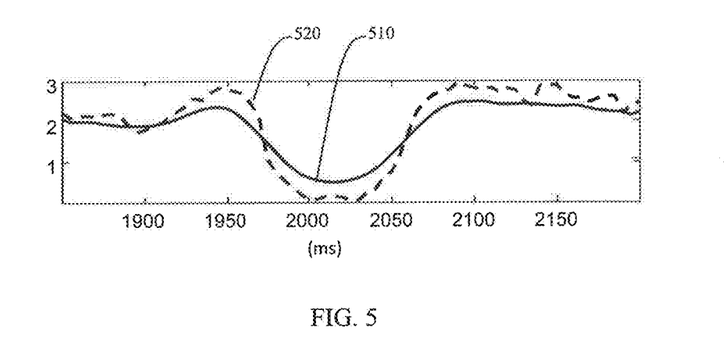
FIG. 5 is a graph depicting a typical time sequences for natural and DNN-estimated MCEP coefficients (d=1)

FIG. 5 is a graph depicting DNN-estimated MCEP coefficients with and without variance and spectral compensation. In particular, plot 510 represents the initial DNN-based estimate of the target speech, $y_m$. As can be seen, the plot 510 of pre-compensated coefficients exhibits relatively significant low-pass filtering which results in a very smooth looking curve. In contrast, the plot 520 depicting the DNN-estimated MCEP coefficients, $y'''_m$, after variance and spectrum compensation exhibit relatively more high-frequency components that produce natural-sounding target speech.

Figure 6:
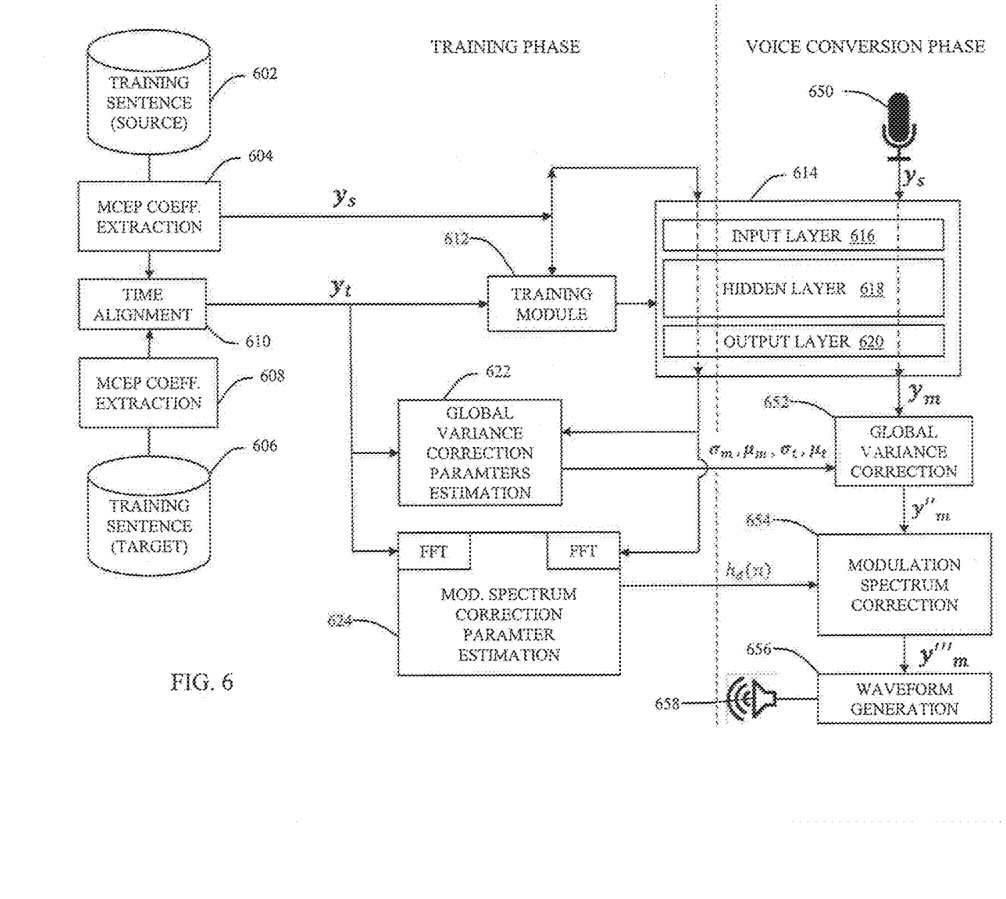
FIG. 6 is a functional block diagram of a system for training and implementing a deep neural network with variance and spectrum compensation, in accordance with one embodiment of the present invention.

Illustrated in FIG. 6 is a functional block diagram of a system for training and implementing a deep neural network (DNN) with variance and spectrum compensation. The functional block diagram is organized with the training components to the left and voice conversion components to the right. The training phase generally focuses on creation of the DNN and correction factors while the voice conversion phase focuses on application of the DNN and correction factors.

Training is based on sets of training sentences from a source speaker and a target speaker, which are represented by databases 602, 606 respectively. The MCEP coefficients are extracted from the training sentences by extraction modules 604, 606. The MCEP coefficients for source and target sentences are then time aligned by an alignment module 610. The output of the alignment module includes target speech frames with corrected timing information as well as the MCEP coefficients, $y_t$, of those frames. The MCEP coefficients, $y_s$, from the source speaker sentences and the time-aligned version of the target speaker sentences are then used by the training module 612 to encode the various nodes and link weights of the DNN, specifically the nodes and links between the input layer 616, hidden layer 618, and output layer 620.

Upon completion of the training, the DNN 614 is able to convert source speech to target speech, but the conversion is unable to reproduce some of the high frequency components needed to generate realistic-sounding target speech. To address this problem, the global variance correction parameter estimate (GVCPE) module 622 computes variance compensation factors by first providing the source training sentences as input to the DNN 614, receiving the estimate of the target voice from the DNN output, and calculating the mean and variance for both the estimate of the target voice from the DNN output as well as the original target training sentences. For each MCEP coefficient, the GVCPE module 622 generates compensation parameters to adjust the MCEP coefficient based on the observed variance. At the time of voice conversion, the global variance correction module 652 takes an estimate of the target voice generated from new source voice data from microphone 650, for example, and applies the correction to that target voice speech in the form of the normalization 430 and de-normalization 440 steps provided in FIG. 4.

As for the spectrum compensation, the modulation spectrum correction parameter estimation (MSCPE) module 624 computes a correction to the time-varying representation of MCEP coefficient. The compensation factor is computed based on (a) the time-aligned representation of the target training sentences and (b) the estimate of the target voice from the DNN generated from the source training sentences. These data sets are received, converted into the frequency domain by Fast Fourier Transform (FFT) modules, and the filter $h_d(n)$ computed. The filter may be computed when training of the DNN is complete and the filter made available to the modulation spectrum correction module 654. Thereafter, when new source voice data is converted into target voice data, the modulation spectrum correction may be adjusted after global variance correction is applied. After both corrections are completed, the modified MCEP coefficients may be provided to a waveform generator 656 and the corrected target voice data played to the user via the speaker 658.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A voice conversion system comprising:
a microphone for recording source speech data;
a neural network for generating estimated target speech data based on the source speech data;
a global variance correction module configured to scale and shift the estimated target speech based on (i) a mean and standard deviation of the source speech data, and further based on (ii) a mean and standard deviation of the estimated target speech data;
a modulation spectrum correction module configured to apply a plurality of filters to the estimated target speech data after being scaled and shifted by the global variance correction module; wherein each filter of the plurality of filters is based on two trajectories comprising (i) a first trajectory consisting of a single feature extracted from a plurality of frames of target training speech data recorded from a target speaker, and (ii) a second trajectory consisting of a single feature extracted from a plurality frames of target training speech data generated by said neural network;
a waveform generator configured to generate a target voice signal based on the estimated target speech data from the modulation spectrum correction module; and
a speaker configured to play the target voice signal.

2. The voice conversion system of claim 1, wherein said plurality of frames of target training speech data recorded from a target speaker is a sequence of frames, and said first trajectory comprises a plot of a feature over time; and wherein said plurality of frames of target training speech data generated by said neural network is a sequence of frames, and said second trajectory comprises a plot of a feature over time.

3. The voice conversion system of claim 2, wherein each filter of the plurality of filters is based on an impulse response based on a Fourier Transform of the first trajectory divided by a Fourier Transform of the second trajectory.

4. The voice conversion system of claim 3, wherein said feature extracted from a plurality of frames of target training speech data recorded from a target speaker is a MCEP coefficient, and said feature extracted from a plurality frames of target training speech data generated by said neural network is a MCEP coefficient.

5. The voice conversion system of claim 4, wherein said first trajectory comprises a plot of an MCEP feature over time, and said second trajectory comprises a plot of an MCEP feature over time.

6. The voice conversion system of claim 4, wherein scale and shift of the estimated target speech based a mean and standard deviation of the source speech data comprises normalization; and scale and shift of the estimated target speech based on a mean and standard deviation of the estimated target speech data comprises de-normalization.

7. The voice conversion system of claim 1, wherein the neural network comprises an input layer, an output layer, and one or more hidden layers connected to the input layer and output layer; wherein the one or more hidden layers comprise at least 512 nodes.

8. The voice conversion system of claim 1, further comprising a time alignment module for aligning the source speech data and the target training speech data recorded from a target speaker.

9. A method of performing voice conversion, the method comprising:
receiving source speech data from a microphone;
generating estimated target speech data based on the source speech data with a neural network;
scaling and shifting the estimated target speech based on (i) a mean and standard deviation of the source speech data, and further based on (ii) a mean and standard deviation of the estimated target speech data;
applying a plurality of modulation spectrum filters to the estimated target speech data after scaling and shifting; wherein each filter of the plurality of filters is based on two trajectories comprising (i) a first trajectory consisting of a single feature extracted from a plurality of frames of target training speech data recorded from a target speaker, and (ii) a second trajectory consisting of a single feature extracted from a plurality frames of target training speech data generated by said neural network;
generating a target voice signal based on the estimated target speech data from the modulation spectrum correction module; and
playing the target voice signal with a speaker.

10. The method of performing voice conversion of claim 9, wherein said plurality of frames of target training speech data recorded from a target speaker is a sequence of frames, and said first trajectory comprises a plot of a feature over time; and wherein said plurality of frames of target training speech data generated by said neural network is a sequence of frames, and said second trajectory comprises a plot of a feature over time.

11. The method of performing voice conversion of claim 10, wherein each filter of the plurality of filters is based on an impulse response based on a Fourier Transform of the first trajectory divided by a Fourier Transform of the second trajectory.

12. The method of performing voice conversion of claim 11, wherein said feature extracted from a plurality of frames of target training speech data recorded from a target speaker is a MCEP coefficient, and said feature extracted from a plurality frames of target training speech data generated by said neural network is a MCEP coefficient.

13. The method of performing voice conversion of claim 12, wherein said first trajectory comprises a plot of an MCEP feature over time, and said second trajectory comprises a plot of an MCEP feature over time.

14. The voice conversion system of claim 12, wherein scale and shift of the estimated target speech based a mean and standard deviation of the source speech data comprises normalization; and scale and shift of the estimated target speech based on a mean and standard deviation of the estimated target speech data comprises de-normalization.

15. The voice conversion system of claim 9, wherein the neural network comprises an input layer, an output layer, and one or more hidden layers connected to the input layer and output layer; wherein the one or more hidden layers comprise at least 512 nodes.

16. The voice conversion system of claim 9, further comprising:
  aligning the source speech data and the target training speech data recorded from a target speaker.

* * * * *